March 22, 1932.  R. E. YOUNG  1,850,948
STEERING GEAR
Filed Jan. 2, 1930   2 Sheets-Sheet 1
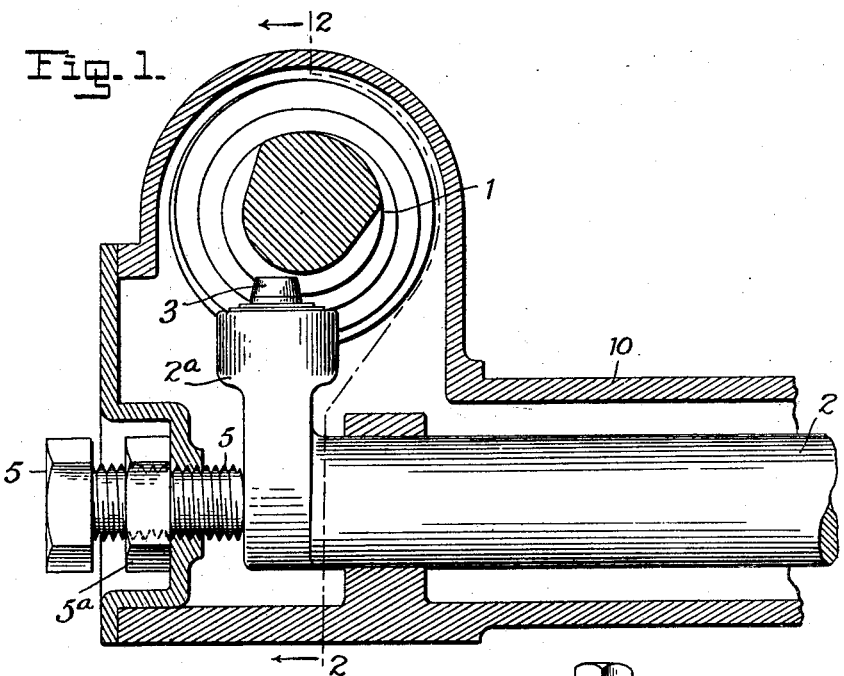
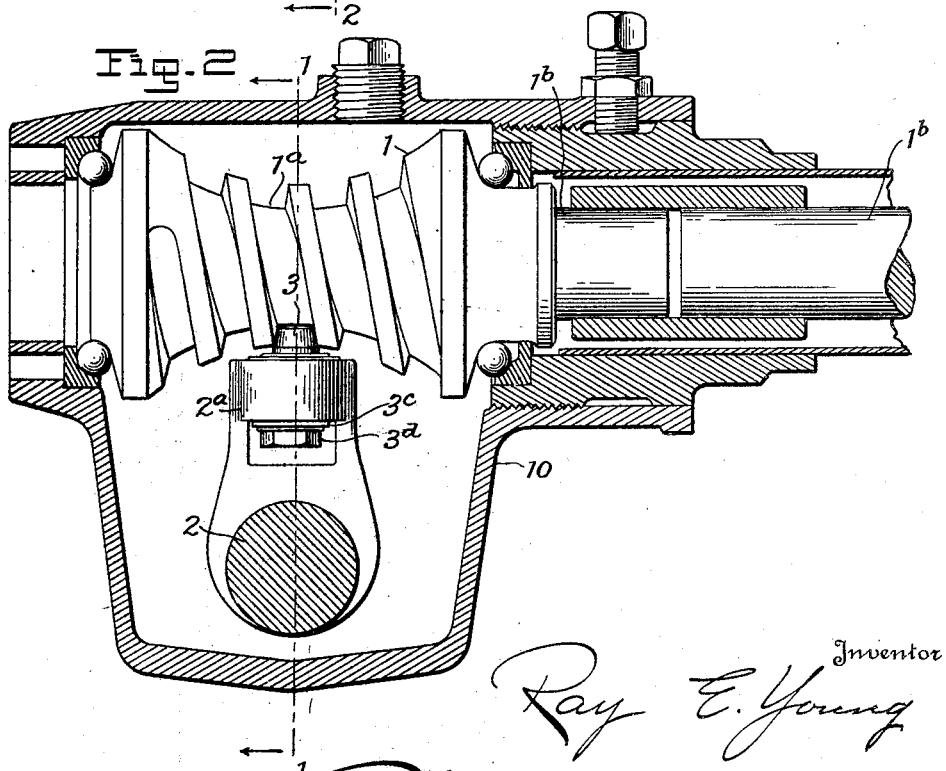
Inventor
Ray E. Young
By Alexander & Powell
Attorneys

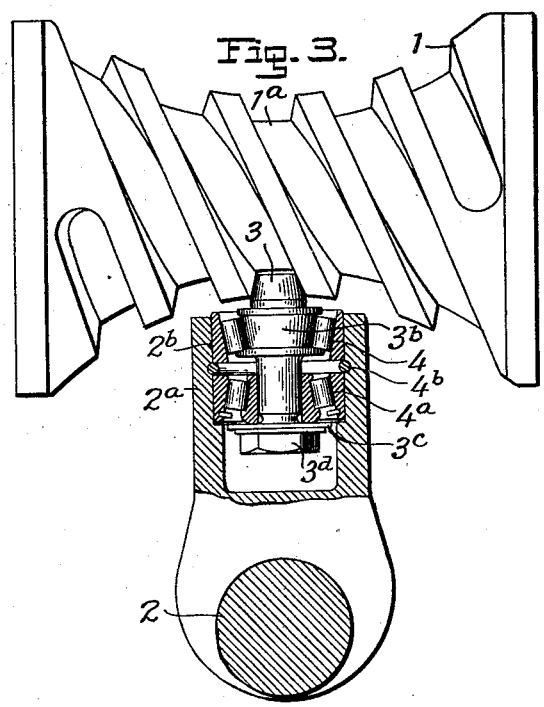

Patented Mar. 22, 1932

1,850,948

UNITED STATES PATENT OFFICE

RAY E. YOUNG, OF LA FAYETTE, INDIANA, ASSIGNOR TO ROSS GEAR & TOOL COMPANY, OF LA FAYETTE, INDIANA, A CORPORATION OF INDIANA

STEERING GEAR

Application filed January 2, 1930. Serial No. 418,064.

This invention is an improvement in steering gears, and its object is to produce a steering mechanism which will be economical to manufacture, simple to adjust and with few wearing parts and will provide a nearly frictionless transmission of the loads encountered.

I will explain the invention with reference to the accompanying drawings to enable others to adopt and use the same; and summarize in the claims the novel features of construction and novel combination of parts for which protection is desired.

In said drawings:

Fig. 1 is a partly sectional view through a steering gear embodying my invention, taken on the line 1—1 Fig. 2.

Fig. 2 is a section on the line 2—2 Fig. 1.

Fig. 3 is an enlarged detail section through the rocker arm and pin.

In the construction shown the gear comprises a worm or actuating member 1 of the hour glass type provided with a single spiral thread or groove 1a. Said member is mounted in anti-friction bearings of any suitable type in a casing 10 of any suitable construction. The worm 1 is usually attached to the lower end of a steering shaft 1b by which it may be manually rotated. A rocker shaft 2 of the usual construction is mounted in the casing and lies with its axis at right angles to the axis of the worm 1. Said shaft has an arm 2a on its end adjacent the worm 1 in the extremity of which arm is a socket 2b in which is rotatably mounted a roller pin the head 3 of which is tapered as shown to accurately engage the groove 1a of the worm 1.

Preferably the pin 3 has its shank 3b mounted in roller bearings 4 and 4a within the socket 2b in the arm 2a, said roller bearings being spaced apart by a rib or ring 4b seated in an annular groove in the socket. The pin 3b is held in position within the bearings by means of a washer 3c and nut 3d.

The roller bearings 4 and 4a are oppositely inclined so that the bearings tend to prevent longitudinal movement of the pin 3 in either direction but facilitate rotation thereof and the ring or rib 4b prevents inward movement of the pin and roller bearing 4 and also prevents outward movement of the pin and roller bearing 4a thus holding the pin accurately in adjusted position relative to the axis of the rocker shaft 2.

In the past it has been customary to provide such reduction in motion between the worm and the rocker shaft as would obtain the desired ease of steering, but such procedure resulted in a very low speed of the steering shaft, and rendered steering the car at high speeds difficult because of the considerable turning of the hand wheel and steering shaft required to move the rocker shaft the desired extent. The use of larger tires on automobiles and trucks and higher speeds have increased the demand for quick response with less friction than the ordinary sliding contact produced by a worm and wheel or worm and sector will allow.

In my invention the conical head of the pin 3 engages with the groove 1a in the worm as previously mentioned; and rotation of the worm will cause the pin and cross shaft to rotate through an arc, as the pin follows the thread of the worm. But as the pin is rotatable in its socket in the rocker shaft arm instead of the customary sliding contact of the pin and groove I have a rotating contact which materially reduces the friction; and the pin being also rotatably mounted in anti-friction bearings reduces the friction between the pin and its seat in the arm of the rocker shaft, and further lessens the friction to be overcome in manipulating the gear.

The end thrust on the shaft 2, caused by the worm engaging the pin can be taken up by any suitable means. As shown a bolt 5 may be tapped through casing 10 opposite the end of the rocker shaft 2. This construction provides a simple means of adjustment to compensate for wear. When the gear is first assembled, the pin is not set directly on a radial line of the worm, but is offset a few degrees, as indicated in Fig. 2. If wear occurs by adjusting bolt 5 the shaft 2 can be moved endwise and shift the pin 3 toward a position more nearly approximating a radial line of the worm and thus compensate for wear. By having the pin on the rocker arm slightly off center when the gear is originally assembled the pin can be adjusted a little closer to the center line of the cam so that after wear occurs which would normally call for an adjustment between the roller pin and the cam, the whole shaft carrying this pin can be shifted endwise so that the axis of the pin will more nearly coincide with the axis of the cam and in this way wedge itself into a closer adjustment.

If it is desired to replace the pin, the closing plate of the casing can be removed and the rocker shaft shifted endwise until the pin can be readily removed, and a new one substituted.

This construction permits the use of a narrow steering gear case, which is desirable as the present tendency is to reduce the width of automobile frames, especially in front of the body proper.

The lead of the thread on the worm can be made variable, thereby producing different steering reduction ratios at one point or another along the arc of travel of the cross shaft.

I claim:

1. A steering gear comprising a casing, a spirally grooved hour glass worm mounted therein, a steering shaft for actuating the worm, a rocker shaft, an arm on said rocker shaft projecting toward the worm and having a socket in its free end, upper and lower anti-friction roller bearings mounted in the socket, a rotatable pin supported in the bearings, the rollers in said bearings being oppositely inclined and preventing axial movement of the pin and an annular member in the socket between the bearings preventing longitudinal movement of the bearings in the socket.

2. A steering gear comprising a casing, a spirally grooved hour glass worm mounted therein, a steering shaft for actuating the worm, a rocker shaft mounted in the casing with its axis disposed at right angles to the axis of the worm, an arm on said rocker shaft adjacent and projecting toward the worm and having a socket in its free end, upper and lower anti-friction roller bearings mounted in the socket, a rotatable pin in said bearings, the rollers in said bearings being oppositely inclined to prevent axial movement of the pin in either direction, a ring in the socket between the bearings and a washer and nut on the inner end of the pin to confine the same in the bearings.

RAY E. YOUNG.